United States Patent
Kato et al.

(10) Patent No.: US 10,247,966 B2
(45) Date of Patent: Apr. 2, 2019

(54) OPTICAL MODULATOR MODULE

(71) Applicant: SUMITOMO OSAKA CEMENT CO., LTD., Tokyo (JP)

(72) Inventors: Kei Kato, Tokyo (JP); Norikazu Miyazaki, Tokyo (JP); Ryo Shimizu, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/719,583

(22) Filed: Sep. 29, 2017

(65) Prior Publication Data
US 2018/0095302 A1 Apr. 5, 2018

(30) Foreign Application Priority Data

Sep. 30, 2016 (JP) .................................. 2016-194741

(51) Int. Cl.
*G02F 1/01* (2006.01)
(52) U.S. Cl.
CPC ............ *G02F 1/0102* (2013.01); *G02F 1/011* (2013.01); *G02F 2201/12* (2013.01)
(58) Field of Classification Search
CPC ..... G02F 1/035; G02F 1/2255; G02F 2201/12
See application file for complete search history.

(56) References Cited

U.S. PATENT DOCUMENTS

| | | | |
|---|---|---|---|
| 2010/0202723 A1* | 8/2010 | Sugiyama | G02F 1/0316 385/2 |
| 2014/0133794 A1* | 5/2014 | Kono | G02F 1/225 385/3 |

FOREIGN PATENT DOCUMENTS

| | | |
|---|---|---|
| JP | 2004185046 | 7/2004 |
| JP | 2014089310 | 5/2014 |

* cited by examiner

*Primary Examiner* — Sung H Pak
*Assistant Examiner* — Hoang Q Tran
(74) *Attorney, Agent, or Firm* — JCIPRNET

(57) ABSTRACT

Provided is an optical modulator module in which a modulation substrate having a plurality of optical modulation units is stored inside a package case. The optical modulator module includes a plurality of signal supply lines configured to supply a modulation signal to the optical modulation unit through a connector terminal which is introduced into the package case. At least two or more of the plurality of signal supply lines are set such that the signal supply lines have overall electrical lengths which are different from each other. A particular part of the signal supply line employs at least one of the following configurations (a) and (b):
(a) setting the signal supply line having a longer overall electrical length to have a wider cross-sectional area of a surface perpendicular to a direction in which the modulation signal propagates; and
(b) setting a cross-sectional area of the particular part to be wider than cross-sectional areas of parts other than the particular part and setting the signal supply line having a longer overall electrical length to have the particular part increased in length.

6 Claims, 6 Drawing Sheets

OPTICAL MODULATOR MODULE

CROSS-REFERENCE TO RELATED APPLICATIONS

This application claims the benefit of Japanese Patent Application No. 2016-194741 filed Sep. 30, 2016, the disclosure of which is herein incorporated by reference in its entirety.

BACKGROUND OF THE INVENTION

Field of the Invention

The present invention relates to an optical modulator module, and particularly to an optical modulator module which includes a plurality of optical modulation units and in which a plurality of signal supply lines for supplying a modulation signal are provided in each of the optical modulation units.

Description of Related Art

Many optical modulators are utilized in the optical communication field and the optical measurement field.

In order to transmit high-speed/large-capacitance information, in regard to a modulation method of the optical modulator, a transmission format of multi-level modulation or multi-level modulation adopting polarization multiplexing, such as quadrature phase shift keying (QPSK) and dual polarization-quadrature phase shift keying (DP-QPSK) employing phase modulation is also diversified from intensity modulation (on-off keying) and the like in the related art.

As illustrated in FIG. 1, in an optical modulator module, a chip (modulation substrate) 1 including an optical modulation unit is built in a metal package case 2.

In order to input a light wave to an optical waveguide which is formed inside the chip or to output a light wave from the optical waveguide, an optical fiber 5 is introduced into the package case 2 from the outside.

In addition, in order to supply an electrical signal to control electrodes (modulation electrode, bias electrode, and the like) provided for modulating a light wave propagating through the optical waveguide inside the chip, an electrical signal is introduced into the package case 2 from an external signal source 4 via a connector terminal 3.

Recently, the number of optical modulation units embedded in one optical modulator module tends to increase.

For example, in accordance with the complicated modulation method such as the multi-level modulation, the number of optical modulation units increases.

Moreover, the optical modulation units are provided in a manner corresponding to each wavelength for multi-wavelength communication, processing is performed by causing a plurality of optical modulators to be embedded in parallel in order to cope with high speed communication, and so on. Consequently, the number of optical modulation units built in one package keeps on increasing.

A modulation signal supplied to the optical modulation unit is introduced into a package case from a signal source outside the optical modulator module via a connector terminal penetrating a wall surface of the package case.

Moreover, the connector terminal and the optical modulation unit are connected to each other through a signal supply line. A modulation signal introduced through the connector terminal propagates through the signal supply line and arrives at the optical modulation unit.

In the related art, in order to cause each of the optical modulation units to have the same time required for a modulation signal to propagate through the connector terminal to the optical modulation unit, a configuration in which the signal supply lines have the same electrical length is employed.

Specifically, in Japanese Laid-open Patent Publication No. 2004-185046, as illustrated in FIG. 2, a delay line 62 is provided in wiring electrodes (60, 61) which are the signal supply lines disposed on the modulation substrate 1 in which a plurality of optical modulation units 10 are embedded.

In FIG. 2 and other drawings for describing wirings, in order to simplify the drawings, only a signal electrode is illustrated, and a ground electrode is omitted.

In addition, in Japanese Laid-open Patent Publication No. 2014-89310, as illustrated in FIG. 3, a delay line 82 is provided in relay lines (80, 81) which are the signal supply lines disposed on a relay substrate 8 disposed between the modulation substrate 1 and connector terminals (30, 31).

In FIG. 3, the optical modulation units provided inside the modulation substrate 1 are illustrated as dotted line frames (a1, a2) in a simplified state.

The wiring electrodes supplying a modulation signal to the optical modulation units (a1, a2) are indicated with reference signs 63 and 64.

The connector terminals (30, 31) and the relay lines (80, 81) of the relay substrate 8 are electrically connected to each other through wires 7 such as gold wires.

The relay lines of the relay substrate 8 and the wiring electrodes of the modulation substrate 1 are also electrically connected to each other through wires or the like.

In a case where the number of optical modulation units disposed on one substrate is increased, or in a case where a plurality of modulation substrates (substrate provided with optical modulation units) are disposed in an arranged manner, the electrical length of the signal supply line from the connector terminal to each of the optical modulation units becomes longer.

Furthermore, in regard to modulation characteristics of each of the optical modulation units, when the electrical length of the signal supply line becomes longer, the modulation characteristics in a high-frequency band are likely to deteriorate.

That is, in regard to the conversion efficiency (E/O characteristics with respect to frequency f) of converting an electrical signal into an optical signal, FIG. 4 illustrates characteristics which vary depending on the electrical length of the signal supply line connected to each of the optical modulation units, as illustrated in graphs G1 to G4.

For example, the graphs G1 to G4 schematically illustrate the E/O characteristics in a case where signal supply wires having electrical lengths different from each other are connected to four optical modulation units. The graph G1 corresponds to a case where the electrical length of the signal supply wire connected to the optical modulation unit is the shortest. On the contrary, the graph G4 corresponds to a case where the electrical length of the signal supply wire connected to the optical modulation unit is the longest.

Generally, when the electrical length of the signal supply line becomes long, as illustrated in the graph G4, the E/O characteristics significantly deteriorates due to a high frequency.

Therefore, when the electrical lengths of other signal supply lines are adjusted to match the signal supply line having the longest electrical length, for example, the graphs G1 to G3 in FIG. 4 are operated closer to the graph G4, so that the modulation characteristics of each of the optical modulation units also significantly deteriorate.

As described above, in an optical modulator requiring a plurality of optical modulation units, deterioration of the modulation characteristics has become an important problem.

In addition, in order to perform high-speed/large-capacitance communication of 100 GHz or higher, a multi-level digital coherent method is utilized by means of multi-level phase modulation, polarization multiplexing, and the like.

In the digital coherent method, in regard to mistiming of a signal caused due to a difference between the electrical lengths, an adjustment can be performed through signal processing using a digital signal processor (DSP) without having deterioration of transmission characteristics, deterioration of the E/O characteristics or unevenness of the E/O characteristics between the signal supply lines caused due to the electrical length of the signal supply line is an extremely important problem.

Furthermore, since a band-widening configuration (high-performance configuration) and a highly integrated configuration of the optical modulator of 400 G/1 T are required, the problem of deterioration of the modulation characteristics becomes a more important object.

SUMMARY OF THE INVENTION

An object of the present invention is to provide an optical modulator module in which deterioration of the modulation characteristics is reduced, as described above.

Particularly, the present invention aims to provide an optical modulator module in which band-widening is realized without having a complicated manufacturing process.

According to the present invention, an optical modulator module has technical features as follows.

(1) There is provided an optical modulator module in which a modulation substrate having a plurality of optical modulation units is stored inside a package case. The optical modulator module includes a plurality of signal supply lines configured to supply a modulation signal to the optical modulation unit through a connector terminal which is introduced into the package case. At least two or more of the plurality of signal supply lines are set such that the signal supply lines have overall electrical lengths which are different from each other. A particular part of the signal supply line employs at least one of the following configurations (a) and (b):

(a) Setting the signal supply line having a longer overall electrical length to have a wider cross-sectional area of a surface perpendicular to a direction in which the modulation signal propagates; and (b) Setting a cross-sectional area of the particular part to be wider than cross-sectional areas of parts other than the particular part and setting the signal supply line having a longer overall electrical length to have the particular part increased in length.

(2) In the optical modulator module according to (1), at least a portion of the particular part of the signal supply line is a wiring electrode which is formed in the modulation substrate.

(3) In the optical modulator module according to (1) or (2), at least a portion of the particular part of the signal supply line is a relay line which is formed in a relay substrate disposed between the modulation substrate and the connector terminal.

(4) In the optical modulator module according to any one of (1) to (3), the modulation substrate is configured to comprise a plurality of substrates each having the optical modulation unit.

According to the present invention, in the optical modulator module, the modulation substrate having the plurality of optical modulation units is stored inside the package case. The optical modulator module includes the plurality of signal supply lines configured to supply a modulation signal to the optical modulation unit through the connector terminal which is introduced into the package case. At least two or more of the plurality of signal supply lines are set such that the signal supply lines have the overall electrical lengths which are different from each other. The particular part of the signal supply line employs at least any one of the configurations of (a) setting the signal supply line having a longer overall electrical length to have a wider cross-sectional area of the surface perpendicular to the direction in which the modulation signal propagates, and (b) setting the cross-sectional area of the particular part to be wider than cross-sectional areas of parts other than the particular part, and the signal supply line having a longer overall electrical length to have the particular part increased in length. Therefore, deterioration of (attenuation) a modulation signal propagating through each of the signal supply lines is prevented.

In addition, since no extra delay line for adjusting the electrical length of each of the signal supply lines is required as in the related art, the modulation characteristics of each of the signal supply lines are improved (band-widened). Moreover, the graphs G2 to G4 in FIG. 4 become closer to the graph G1. Therefore, it is possible to provide an optical modulator module in which deterioration of the modulation characteristics is further reduced.

Furthermore, since the reduction of the deterioration of the modulation characteristics can be easily realized by adjusting the cross-sectional area of the signal supply line or the length of the line having a particular shape, a manufacturing process is not complicated.

DETAILED DESCRIPTION OF THE INVENTION

Hereinafter, an optical modulator module according to the present invention will be described in detail.

Figure 5:
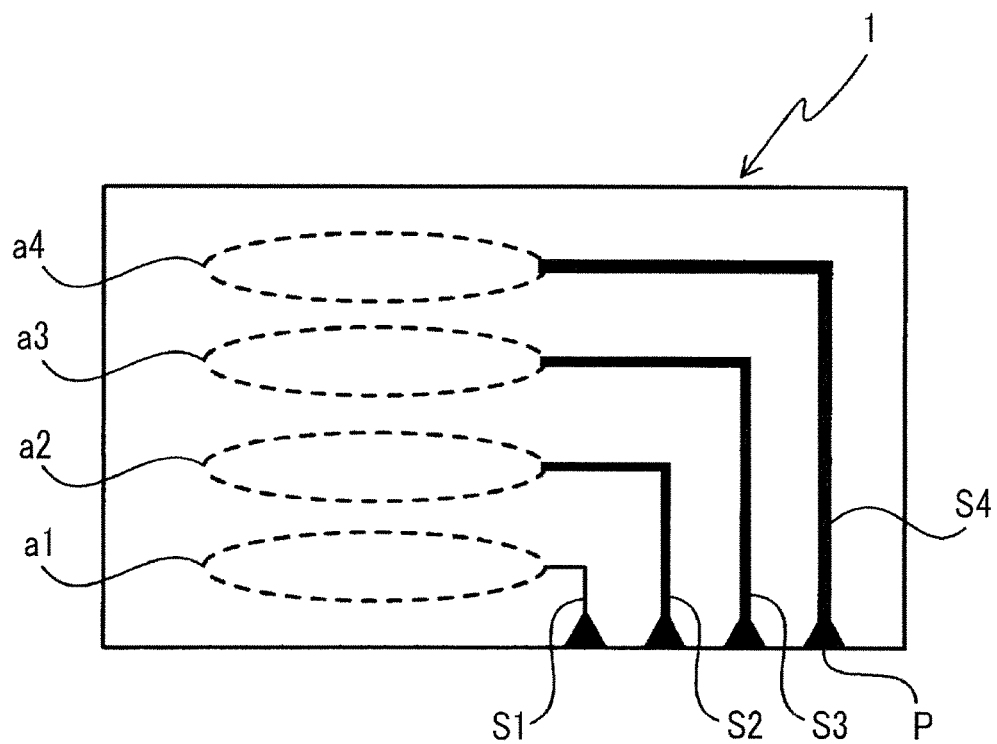
FIG. 5 is a view describing a first example of the optical modulator module according to the present invention.
Figure 6:
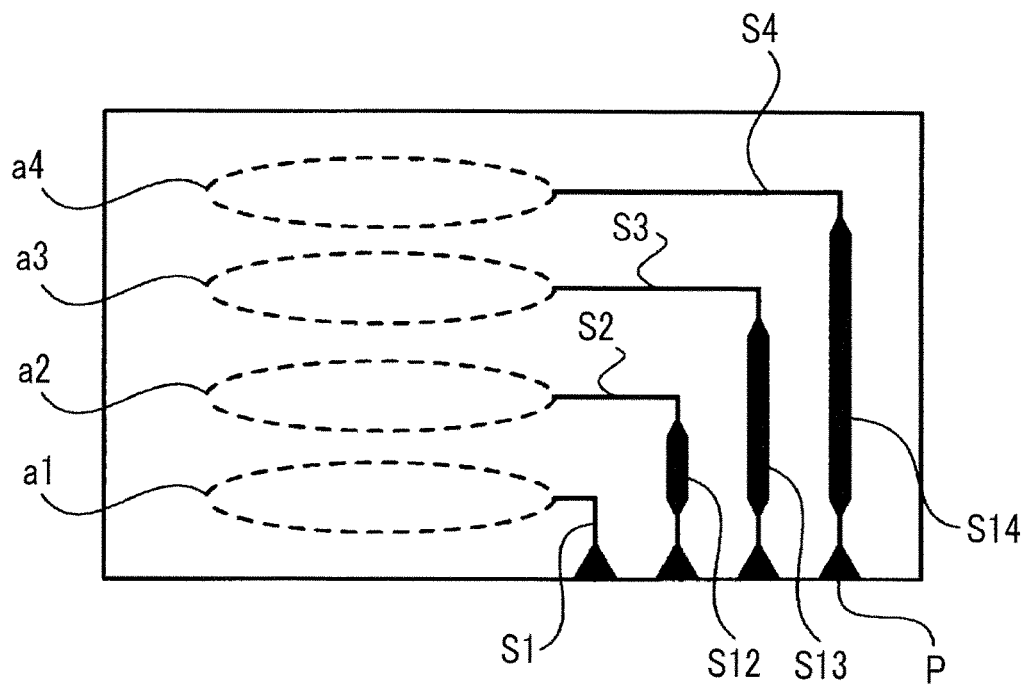
FIG. 6 is a view describing a second example of the optical modulator module according to the present invention.
Figure 7:
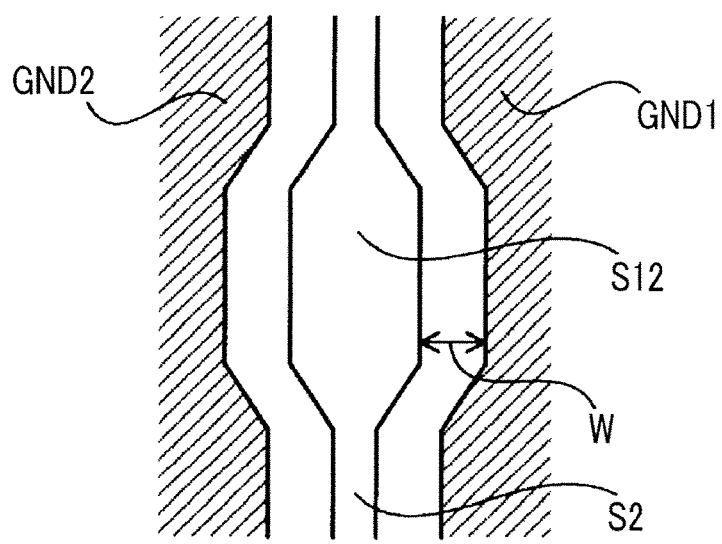
FIG. 7 is a view describing a third example of the optical modulator module according to the present invention.

As illustrated in FIGS. 5 to 7, in an optical modulator module in which the present invention is applied, modulation substrates (1, 10, 11) having a plurality of optical modulation units (a1 to a4) are stored inside a package case. The optical modulator module includes a plurality of signal supply lines configured to supply a modulation signal to the optical modulation unit through a connector terminal which is introduced into the package case. At least two or more of the plurality of signal supply lines are set such that the signal supply lines have overall electrical lengths which are different from each other. A particular part of the signal supply line employs at least one of the following configurations (a) and (b):

(a) Setting the signal supply line having a longer overall electrical length to have a wider cross-sectional area of a surface perpendicular to a direction in which the modulation signal propagates; and (b) Setting a cross-sectional area of the particular part to be wider than cross-sectional areas of parts other than the particular part and setting the signal supply line having a longer overall electrical length to have the particular part increased in length.

Figure 1:
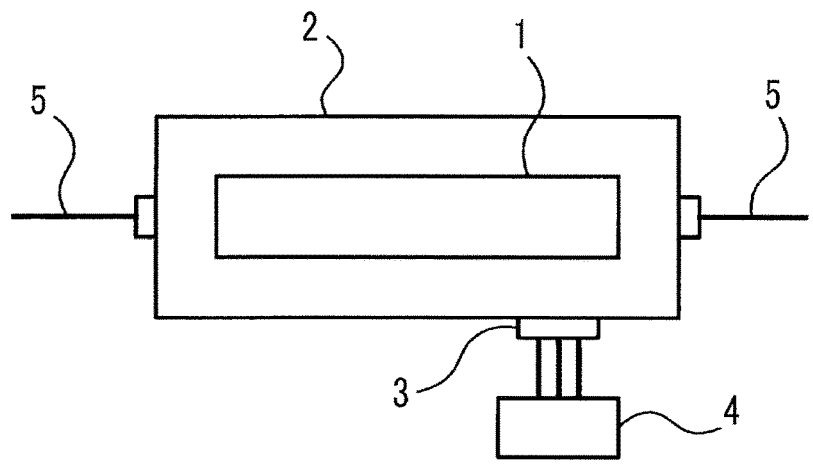
FIG. 1 is a view illustrating an overview of an optical modulator module.
Figure 2:
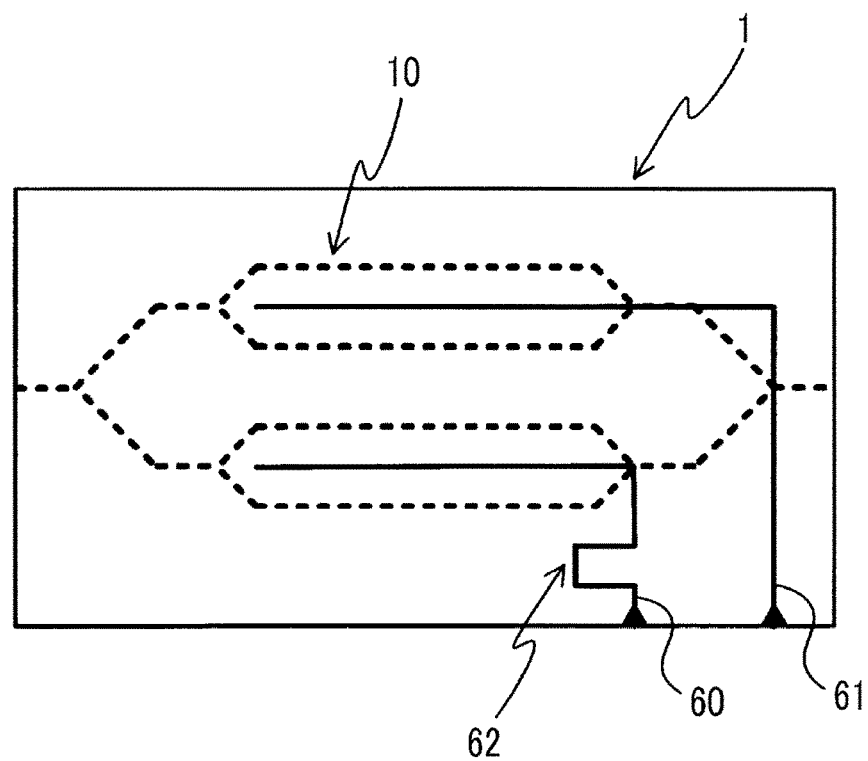
FIG. 2 is a view describing an example in the related art in which a delay line is provided in wiring electrodes inside a modulation substrate.

The overall configuration of the optical modulator module overlaps the configuration described in FIG. 1 and the description will not be repeated herein. Hereinafter, main technical features of the present invention will be described in detail.

The "signal supply line" employed in the present invention denotes an entire signal supply wiring from an input end portion through which an electrical signal (RF signal) is input to the optical modulator module to the modulation substrate, to each of the optical modulation units.

Figure 3:
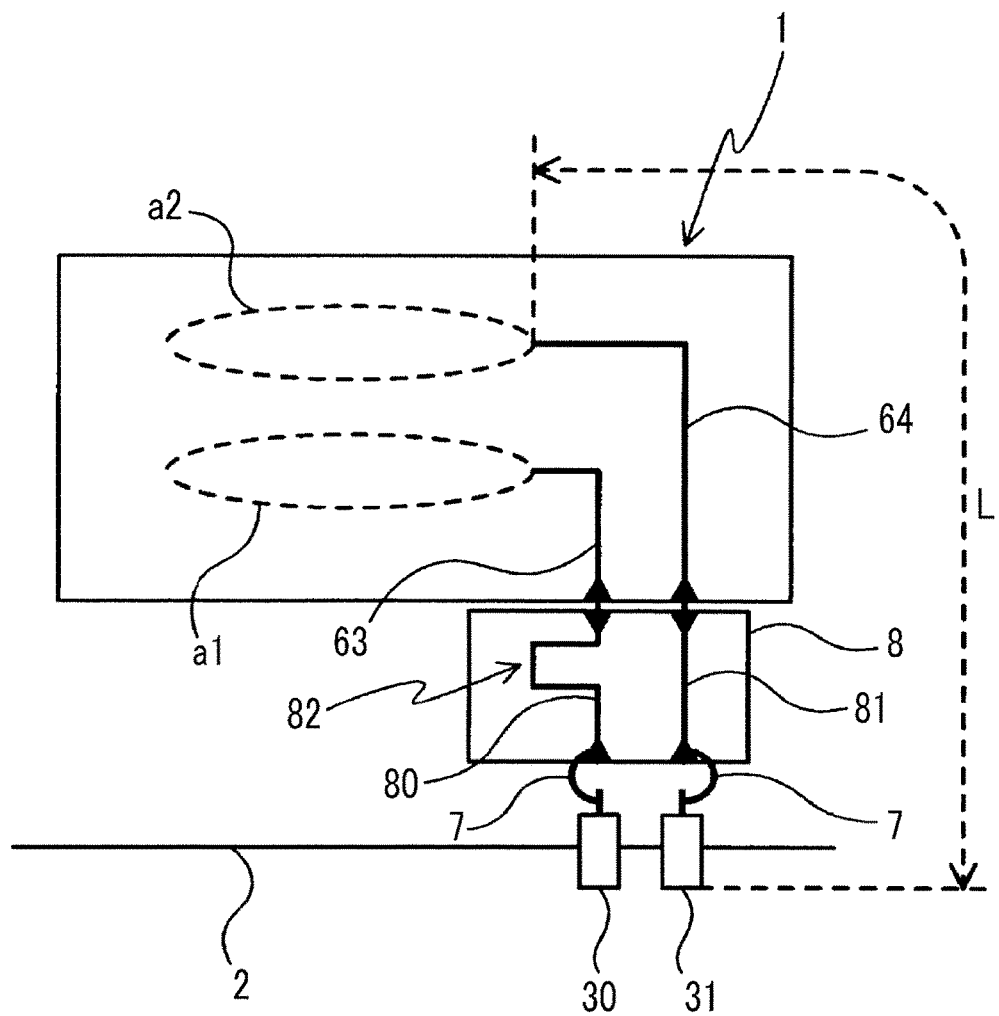
FIG. 3 is a view describing another example in the related art in which a delay line is provided in relay lines inside a relay substrate.
Figure 4:
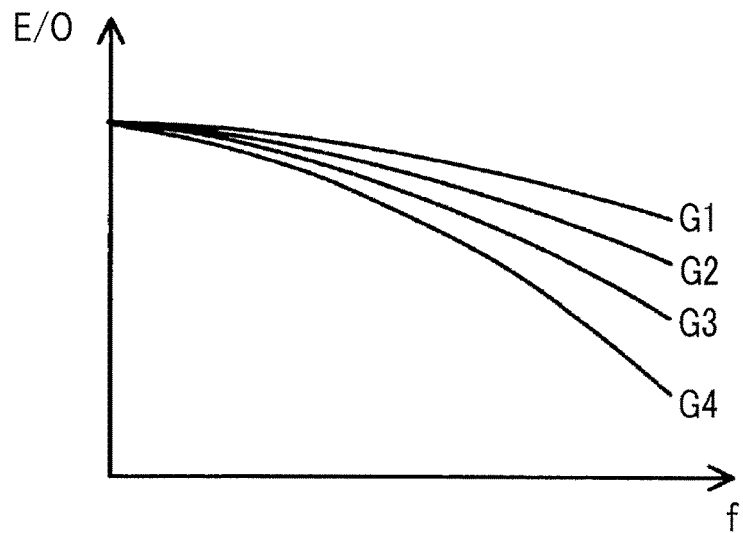
FIG. 4 is a graph illustrating a state of modulation characteristics in a case where the electrical length of a signal supply line varies (G1 is the shortest and G4 is the longest).

Therefore, in the case of FIG. 3, a length L from coaxial connectors (30, 31) to the optical modulation units (a1, a2) becomes an "electrical length of the signal supply wiring".

In addition, in a case where the electrical signal input terminal of the optical modulator module is provided in a flexible printed circuit (FPC) which is attached to the optical modulator module, a portion from the input terminal to the optical modulation unit of the FPC becomes the "signal supply wiring".

FIG. 5 is a schematic view of a first example of the optical modulator module according to the present invention, describing a configuration of a chip (modulation substrate) which is embedded inside the package case.

As illustrated in FIG. 5, the plurality of optical modulation units (a1 to a4) are provided in one modulation substrate 1.

An optical waveguide is formed in the substrate. In order to modulate a light wave propagating the optical waveguide, the optical modulation unit includes a control electrode for applying an electric field to the optical waveguide.

The control electrode has a modulation electrode applying a modulation signal, or a bias electrode applying a DC bias voltage.

The optical modulation unit of the present invention denotes a part at least including this modulation electrode.

As a modulation substrate, it is possible to utilize a substrate which is formed of $LiNbO_3$ and has an electro-optic effect, or a substrate which is formed of a semiconductor-based material such as InP, Si, and GaAs.

In addition, it is possible to utilize a forming method in which Ti or the like is thermally diffused, or a method of forming a ridge in a substrate, for the optical waveguide.

An electrode can be formed by utilizing gold plating or the like.

When the optical modulation unit of the present invention is formed, it is needless to mention that various known techniques in the optical modulator field can be applied.

As illustrated in FIG. 5, the signal supply lines for respectively supplying a modulation signal to the optical modulation units (a1 to a4) are wiring electrodes (S1 to S4). The electrical lengths of the signal supply lines are set to be sequentially long in the order from S1 to S4.

In contrast, in the present invention, a wiring electrode (S1 to S4) having a long signal supply line is configured to have a wider line width.

Accordingly, in a case where the signal supply line is long, a propagation loss of a modulation signal is likely to occur. However, when the cross-sectional area of the signal supply line is widened, a propagation loss can be prevented from occurring. As a result, deterioration of the modulation characteristics can be prevented.

In FIG. 5, the electrical length of the signal supply line only the part of the modulation substrate is considered. Naturally, it is preferable to set the cross-sectional area of the signal supply line in consideration of the electrical length of the signal supply line from a connector of the optical modulator module or the input terminal of the FPC to the optical modulation unit.

FIG. 5 discloses a technology of changing the width of the signal supply line. However, as described above, when the cross-sectional area of the signal supply line is changed, an occurrence state of a propagation loss can be adjusted. Therefore, it is also possible to cope with the occurrence state of a propagation loss by changing the thickness of the signal supply line (thickness in a direction perpendicular to the sheet of the drawing).

FIG. 6 is a view describing a second example of the optical modulator module according to the present invention.

As the feature in FIG. 6, the cross-sectional areas of surfaces of particular parts (S12, S13, S14) of the signal supply lines perpendicular to the direction in which a modulation signal propagates are set to be wider than cross-sectional areas of parts other than the particular parts (for example, other than the particular part S12 of the wiring electrode S2), and the signal supply lines having a longer overall electrical length are set to have the particular parts (S12, S13, S14) increased in length.

Naturally, the second example can be used in combination with the first example.

As in FIG. 6, when the particular part has a shorter length, the signal supply line has lower electric resistance. Therefore, a propagation loss can be prevented.

FIG. 7 is a view describing a third example of the optical modulator module according to the present invention.

As in the second example, in the particular part of the signal supply line, when the shape of the line is changed, characteristic impedance of the electric line changes.

In this case, deterioration of the electrical signal is caused. Therefore, as illustrated in FIG. 7, a gap W between signal electrodes (signal lines) (S2, 212) and ground electrodes (ground lines) (GND1 and GND2) is adjusted, such that characteristic impedance in the particular part of the signal supply line is set to be the same or not to significantly change.

Figure 8:
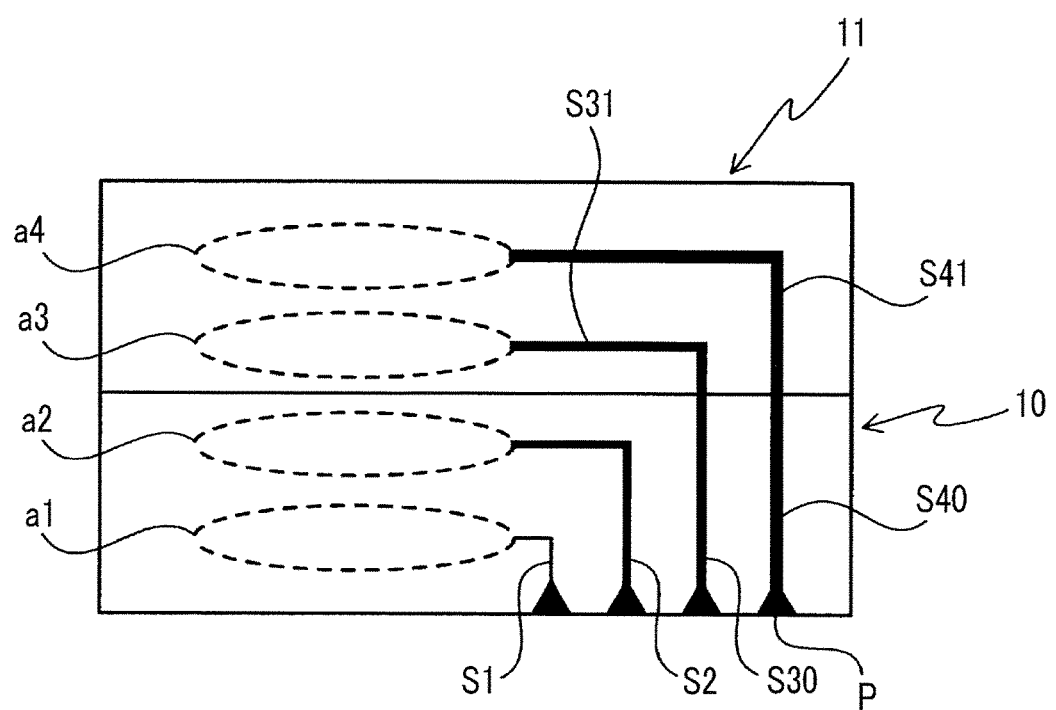
FIG. 8 is a view describing a fourth example of the optical modulator module according to the present invention.

FIG. 8 is a view describing a fourth example of the optical modulator module according to the present invention.

The difference with respect to the first example in FIG. 5 is that the modulation substrate is constituted by two substrates (10, 11) in FIG. 8.

Even in such case, a state where the length of the signal supply line varies in accordance with each of the optical modulation units (a1 to a4) occurs. As a result, the modulation characteristics in each of the optical modulation units change.

In order to adjust this inconvenience, the widths (cross-sectional areas of the wirings) of the wiring electrodes (S1, S2, S30, S31, S40, S41) which are the signal supply lines are configured to be adjusted, so that a change in the modulation characteristics among the optical modulation units can be reduced.

In FIG. 8, the widths of the wiring electrodes (S30 and S31, S40 and S41) in the substrate 10 and the substrate 11 are substantially the same as each other. As necessary, even though the wiring electrodes the same as each other, the substrate 10 and the substrate 11 may have widths different from each other.

Moreover, the wiring electrodes may have widths different from each other in only the substrate 10, and all the wiring electrodes can have the same width in the substrate 11.

Naturally, it is possible to employ a reversed configuration thereof.

In addition, the configuration of the particular part illustrated in FIG. 6 can be employed in at least one of the substrate 10 and the substrate 11.

Figure 9:
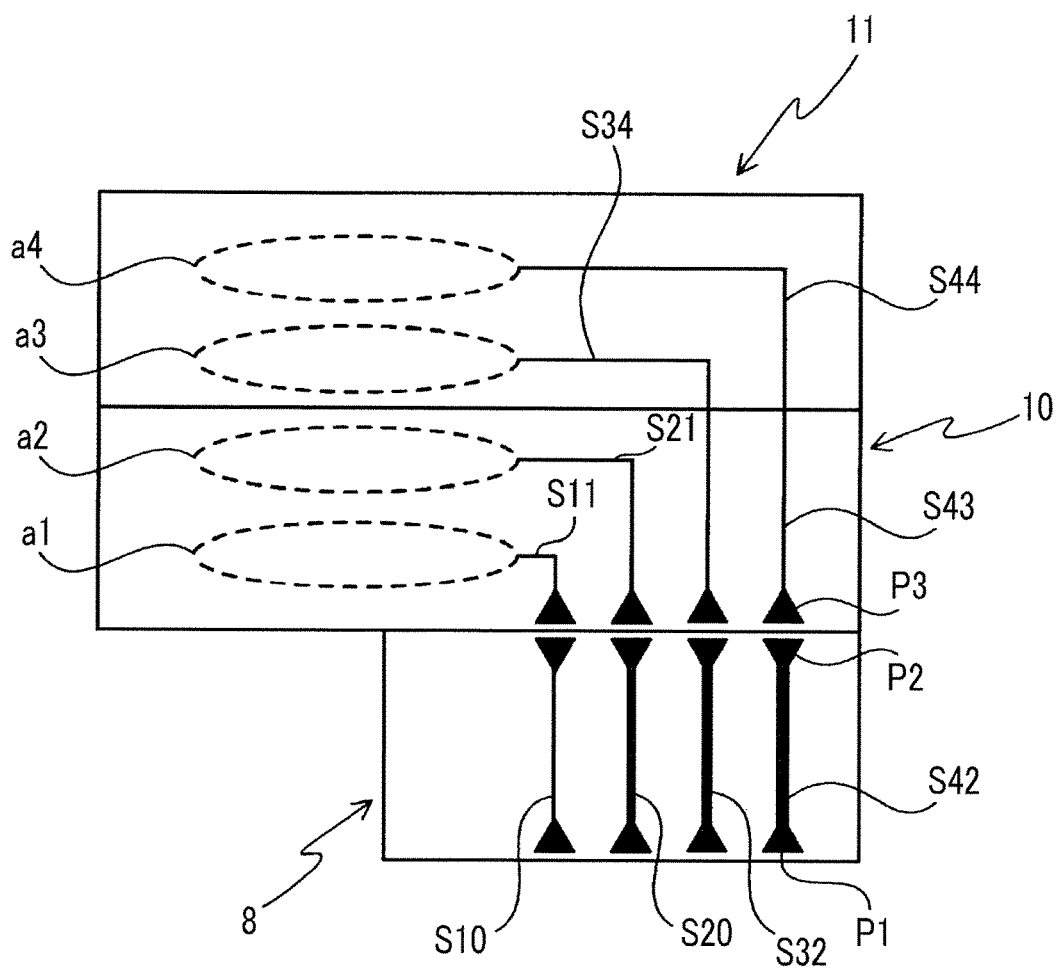
FIG. 9 is a view describing a fifth example of the optical modulator module according to the present invention.

FIG. 9 is a view describing a fifth example of the optical modulator module according to the present invention.

Similar to FIG. 8, a case of employing two modulation substrates (10, 11) will be mainly described. However, the present example can be applied even in a case where the modulation substrate is constituted by one modulation substrate 1 as in FIG. 5.

As the feature in FIG. 9, in relay lines (S10, S20, S32, S42) of a relay substrate 8, the width or the thickness (thickness in a direction perpendicular to the sheet of the drawing) of the signal supply line is adjusted, so that the cross-sectional area of the signal supply line is changed.

In accordance therewith, the widths (cross-sectional areas) of the wiring electrodes in the modulation substrate 10 or the modulation substrate 11 are set to be the same as each other in all the signal supply lines.

Naturally, it is possible to have a configuration in which the widths (cross-sectional areas) of the relay lines are the same width, and the widths (cross-sectional areas) of the wiring electrodes are different from each other.

Naturally, it is possible to set the widths of both thereof to be different from each other.

In addition, the configuration of the particular part illustrated in FIG. 6 can also be employed in the relay substrate 8.

In this manner, it is needless to mention that various configurations illustrated in FIG. 5 to FIG. 9 can be used by being suitably combined together.

In the first to fifth examples described above, since the signal supply lines have lengths different from each other, when modulation signals of the same phase are supplied to the connector terminals to which the signal supply lines are connected, modulation mistiming of each of the optical modulation units is caused as a result.

In order to solve such an inconvenience, it is preferable to employ a signal source including a digital signal processing function (DSP), as an external signal source 4 illustrated in FIG. 1.

The phase of a modulation signal supplied to each of the connector terminals is adjusted by means of the DSP, so that the applying timing of a modulation signal to be supplied to each of the optical modulation units can be optimally set.

As described above, according to the present invention, it is possible to provide an optical modulator module in which deterioration of the modulation characteristics is reduced.

Furthermore, it is possible to provide an optical modulator module in which band-widening is realized without having a complicated manufacturing process.

What is claimed is:

1. An optical modulator module in which a modulation substrate having a plurality of optical modulation units is stored inside a package case, the optical modulator module comprising:
    a plurality of signal supply lines configured to supply a modulation signal to the optical modulation unit through a connector terminal which is introduced into the package case,
    wherein at least two or more of the plurality of signal supply lines are set such that the signal supply lines have overall electrical lengths which are different from each other, and
    wherein a cross-sectional area of a particular part of the signal supply line is set to be wider than cross-sectional areas of parts other than the particular part and the signal supply line having a longer overall electrical length is set to have both the particular part and the parts other than the particular part increased in length, and the particular part of the signal supply line and the parts other than the particular part of the signal supply line are both disposed on the same modulation substrate which is a single monolithic substrate formed integrally.

2. The optical modulator module according to claim 1, wherein at least a portion of the particular part of the signal supply line is a wiring electrode which is formed in the modulation substrate.

3. An optical modulator module in which a modulation substrate having a plurality of optical modulation units is stored inside a package case, the optical modulator module comprising:
    a plurality of signal supply lines configured to supply a modulation signal to the optical modulation unit through a connector terminal which is introduced into the package case,
    wherein at least two or more of the plurality of signal supply lines are set such that the signal supply lines have overall electrical lengths which are different from each other, and
    wherein a particular part of the signal supply line having a longer overall electrical length is set to have a wider cross-sectional area of a surface perpendicular to a direction in which the modulation signal propagates than the particular part of the signal supply line having a shorter overall electrical length.

4. The optical modulator module according to claim 3, wherein at least a portion of the particular part of the signal supply line is a wiring electrode which is formed in the modulation substrate.

5. The optical modulator module according to claim 3, wherein at least a portion of the particular part of the signal supply line is a relay line which is formed in a relay substrate disposed between the modulation substrate and the connector terminal.

6. The optical modulator module according to claim 3, wherein the modulation substrate is configured to comprise a plurality of substrates each having the optical modulation unit.

\* \* \* \* \*